Figure 1:
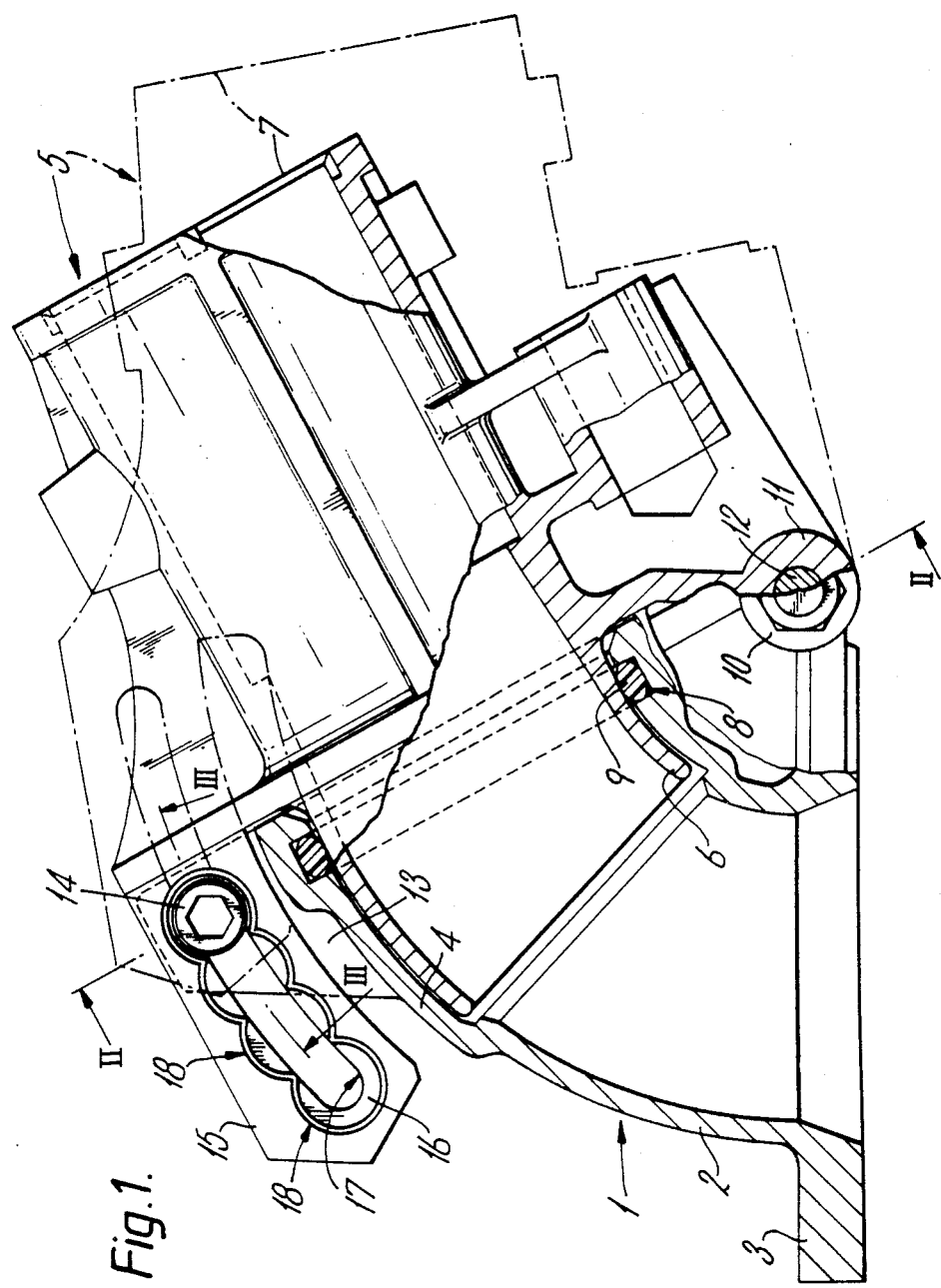

United States Patent [19]

Drechsel

[11] Patent Number: 4,652,017
[45] Date of Patent: Mar. 24, 1987

[54] ARTICULATED CONNECTOR PARTICULARLY FOR ADJUSTING THE JET INCLINATION OF IRRIGATORS

[76] Inventor: Arno Drechsel, 4, Via Castel Mareccio, 4, I-39100 Bolzano, Italy

[21] Appl. No.: 736,309

[22] Filed: May 21, 1985

[30] Foreign Application Priority Data

Dec. 21, 1984 [IT] Italy .................. 46888 A/84

[51] Int. Cl.⁴ ............................................. F16L 27/00
[52] U.S. Cl. .................................... 285/5; 285/184
[58] Field of Search ............... 285/184, 283, 264, 5; 403/98, 96, 93, 92

[56] References Cited

U.S. PATENT DOCUMENTS

| | | | |
|---|---|---|---|
| 246,169 | 8/1881 | Manly | 403/98 |
| 557,799 | 4/1896 | Gorter | 285/184 X |
| 1,474,155 | 11/1923 | Krause | 285/283 X |
| 1,487,517 | 3/1924 | Krause | 285/283 X |
| 2,008,742 | 7/1935 | Benjamin | 403/92 X |
| 3,258,848 | 7/1966 | Watlington | 285/283 X |
| 3,345,092 | 10/1967 | Athman et al. | 285/283 |
| 4,421,279 | 12/1983 | Drechsel | 285/184 X |

*Primary Examiner*—Thomas F. Callaghan
*Attorney, Agent, or Firm*—Birch, Stewart, Kolasch & Birch

[57] ABSTRACT

An articulated connector comprises two pipe pieces (1), (5), which are in constant mutual communication and are partly inserted one into the other by way of respective curved portions (4, 6) under fluid-tight engagement, said curved portions (4, 6) being arranged for swivelling about a common axis (12) situated external to the connector and containing the common center of curvature of said curved portions (4, 6). Means (13, 14, 15) are provided for locking/releasing the pipe pieces (1, 5).

3 Claims, 3 Drawing Figures

ARTICULATED CONNECTOR PARTICULARLY FOR ADJUSTING THE JET INCLINATION OF IRRIGATORS

SUMMARY OF THE INVENTION

The present industrial invention patent relates to a connector which enables the jet inclination in irrigators in general to be adjusted very rapidly and easily, even when they are in operation.

In windy zones or on windy days, currently available irrigators are known to be practically unusable because of the impossibility of suitably adjusting their jet inclination as the wind intensity and direction changes.

In this respect, the use of known irrigators in such windy zone or on such windy days is very difficult because of the influence of the wind on the jet, resulting in water losses, displacement of the jet towards undesirable zones, irregular water distribution over the zones to be irrigated, and consequent poor irrigation thereof.

Moreover, inefficient irrigation under the aforesaid conditions is worsened by the fact that very often the wind speed changes several times during the course of one day, so that if a particular jet inclination is suitable for a particular wind speed, the same inclination is certainly unsuitable for a different wind speed.

This situation is currently remedied by using in such zones irrigators which have a certain fixed inclination, but which are difficult to adapt to the contingent situation.

Consequently, there is a widespread requirement in this sector for an irrigator, or at least a device able to be associated with any irrigator of known type, by means of which it is possible to easily and rapidly adjust the jet inclination, even while the irrigator is in operation.

This would enable regular irrigation to be obtained even in the presence of wind, because the adjustment would adapt the jet inclination, and thus also the jet throw, to the force of the wind.

The present invention provides and protects an articulated connector for irrigators in general, which is able to satisfy the noted requirements by means of a simple and rational design.

This is attained according to the invention by a connector comprising two mutually communicating, consecutive pipe pieces provided with curved portions which are telescopically inserted in a fluid-tight manner one into the other, and which can mutually interpenetrate and withdraw in order to vary their angular position about a common hinging axis which constitutes the centre of the curved portions, and which is therefore situated external to the pipe pieces, orthogonally to their plane of mutual swivel.

The pipe pieces, of tubular shape, can be either straight or curved beyond their curved positions, so that the invention can be mounted on a known irrigator in place of the elbow which connects together the feed column and propelling tube.

In particular, according to the invention the two curved portions comprise an arcuate tubular element of male type and a tubular element of female type, both having the same average curvature, between the male and female elements there being interposed elastic seal means arranged to allow mutual sliding of the elements.

Furthermore, on the opposite side of the connector to that occupied by the hinging axis of the two pipe pieces, there is provided a device for adjusting the pipe pieces and locking them in position, it consisting for example of a screw-nut coupling. More advantageously, according to a preferred embodiment the device consists of a through pin held elastically in position and locking together two plates associated with the pipe pieces, in one plate there being provided a hole and in the other there being provided a slot.

The centre of curvature of the slot falls on the common axis of mutual swivel of the two pipe pieces, and in the sides of the slot there can be provided widened portions arranged to define a like number of predetermined swivel positions, and which receive the widened head of said pin.

The aforesaid design therefore makes it possible, and extremely simple, to adjust the jet inclination even when the corresponding irrigator is in operation, and the invention has the necessary transverse rigidity for withstanding the vibrations and forces transmitted both by the jet deflector and by the thrust deflector, or by other means provided for the right and left hand rotation.

The characteristics and constructional merits of the invention will be more apparent from the description given hereinafter with reference to the figures of the accompanying drawings, which illustrate a preferred embodiment thereof by way of non-limiting example.

Figure 2:
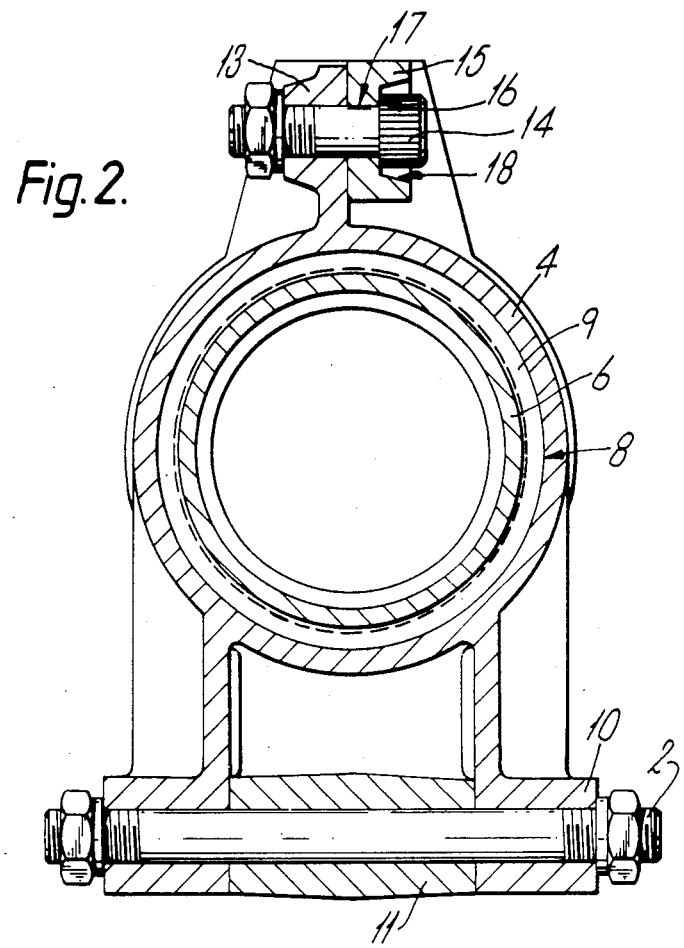
Figure 3:
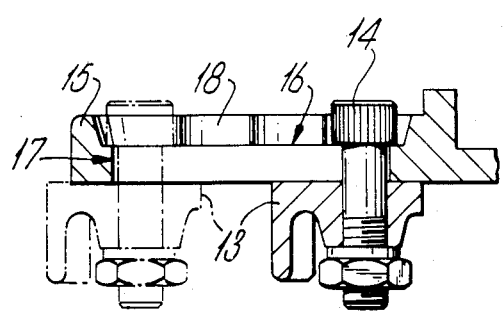

FIG. 1 is a partly sectional side view of the invention.
FIG. 2 is a section on the line II—II of FIG. 1.
FIG. 3 is a section on the line III—III of FIG. 1.

The figures show a first curved tubular element or pipe piece 1 (FIG. 1) of circular cross-section (FIG. 2), comprising a connection portion 2 provided with a terminal flange 3, and a curved engagement portion 4. The water feed column, not shown, is connected to the flange 3.

A second pipe piece, indicated overall by 5, is provided comprising a curved engagement portion 6 which is inserted into the curved portion 4 of the pipe piece 1, and a terminal straight portion 7 to which the propelling tube is fixed.

The inner surface of the curved portion 6 constitutes the direct continuation of the bore through the connection portion 2 of the pipe piece 1.

It will be apparent that the two pipe pieces form, as shown, a connector which replaces the usual rigid bend provided between the feed column and propelling tube of a normal irrigator.

In this respect, as stated the terminal straight portion 7 of the pipe piece 5 is designed for receiving and fixing to a propelling tube (not shown), and the flange 3 of the pipe piece 1 is designed for fixing to the normal bearing device interposed between said propelling tube and the corresponding water feed column, also not shown.

With further reference to FIG. 1, it can be seen that the two curved portions 4, 6 are telescopically engaged with each other, and in proximity to the free end of the outer curved portion 4 there is internally provided a circumferential groove 8 which acts as a seat for an elastic seal ring 9, the inner generating lines of which rest against the outer surface of the inner curved portion 6. The ring 9 can alternatively be disposed on the outside of the inner curved portion 6.

As shown, on the inward side of the connector, the flange 3 comprises a fork 10, between the arms of which there is inserted a bored appendix 11 which branches from the second pipe piece 5.

A hinge pivot 12 is inserted through the aligned bores of said arms and appendix 10, 11, to allow mutual swivelling of the pipe pieces 1, 5. Said pivot 12 is therefore disposed orthogonally to the plane of swivel of these latter, and has its axis on the common centre of curvature of the curved portions 4 and 6.

As also shown in FIGS. 2 and 3, on the outward side of the connector, i.e. on the opposite side thereof to that occupied by the pivot 12, the pipe piece 1 comprises a profiled lug 13 provided with a through hole through which there freely passes a pin 14 parallel to the axis 12 and provided with a widened head.

The profiled lug 13 is situated (see FIG. 2) on one side of the central plane of swivel of the connector, while on the other side of the plane there is provided a projecting plate 15 branching from the pipe piece 5.

The two facing surfaces of said lug 13 and plate 15 are disposed practically in mutual contact, and on the opposite face of the plate 15 there is provided an elongated arcuate cavity 16 with its centre of curvature on the axis of 12. In the base of said cavity 16 there is centrally provided an arcuate slot 17 having the same average curvature as the cavity 16.

As is clearly shown in the figures, the cavity 16 receives the widened head of the pin 14, the shank of which passes through the slot 17 and through the hole in the lug 13, beyond which the pin 14 comprises a thread on which a locking/release nut is screwed.

Finally, the lateral surface of the cavity 16 comprises a succession of recesses 18 of slightly conical surface to provide four equidistant seats for receiving the head of the pin 14, ie four predetermined selection positions for the inclination between the pipe pieces 1 and 5.

It is however apparent that the length of the slot 17 and the number of seats 18 can vary.

In FIG. 1, the range of swivel is about 18°, with an angle of about 6° between two successive swivel positions.

From tests carried out, it has been found that the degree of adjustment offered, relative to the normal inclination of an irrigator propelling tube to the horizontal, is sufficient for adapting the jet to a multiplicity of wind situations.

Finally, it is apparent that the widened head of the pin 14 could be allowed to slide in a continuously adjustable manner in the cavity 17, to obtain a very fine selection of the jet inclination.

The utilisation, objects and advantages of the invention are apparent from the aforegoing description and from the accompanying figures.

The invention is not limited to the single embodiment heretofore described, and modifications and improvements can be made thereto but without leaving the scope of the invention idea, the basic characteristics of which are summarised in the following claims.

What is claimed is:

1. An articulated connector for interposing between the water feed column and propelling tube of an irrigator comprising:
    two consecutive intercommunicating pipe pieces (1), (5),
    each said pipe piece including a pipe portion (4), (6) having a constant diameter and a curved longitudinal axis,
    said pipe portions (4), (6) being telescopically and axially slidably inserted into each other in a sealed connection,
    said pipe portions (4), (6) being hinged together at a common pivot,
    said common pivot being spaced from said pipe portions (4), (6) and being located at the geometrical center around which each said longitudinal axis is formed, and
    locking means for locking said pipe portions (4), (6) to each other in adjustable positions along said curved longitudinal axes.

2. A connector as claimed in claim 1, characterised in that said adjustable mutual locking means comprise a lug (13) and a plate (15) which face each other and are fixed respectively to the pipe piece (1) and to the pipe piece (5), there being provided a through clamping pin (14) inserted through a hole in the lug (13) and through an arcuate slot (17) provided in the plate (15) and having its centre of curvature coinciding with the hinge pivot (12).

3. A connector as claimed in claim 1, characterised in that the through pin (14) comprises a widened head at one end, and the slot (17) comprises a number of equidistant recessed seats for receiving said widened head, the other end of the through pin (14) being provided with a threaded portion and a relative locking nut.

* * * * *